United States Patent
Yamazaki

(10) Patent No.: US 7,824,028 B2
(45) Date of Patent: Nov. 2, 2010

(54) METHOD FOR SELECTING WATER-BASED INK AND WETTING SOLUTION FOR INK-JET RECORDING

(75) Inventor: Hideto Yamazaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 932 days.

(21) Appl. No.: 11/516,648

(22) Filed: Sep. 7, 2006

(65) Prior Publication Data

US 2007/0058013 A1    Mar. 15, 2007

(30) Foreign Application Priority Data

Sep. 14, 2005   (JP) ............... 2005-266739

(51) Int. Cl.
*G01D 11/00* (2006.01)

(52) U.S. Cl. ............... 347/100; 347/84; 347/85; 347/95

(58) Field of Classification Search ............. 347/84–86, 347/95–100
See application file for complete search history.

(56) References Cited

U.S. PATENT DOCUMENTS

| 6,070,310 | A  |   | 6/2000 | Ito et al. |
| 6,247,782 | B1 |   | 6/2001 | Takata |
| 6,559,296 | B2 | * | 5/2003 | Suyama ............... 536/23.1 |
| 2004/0056918 | A1 |   | 3/2004 | Wang et al. |

FOREIGN PATENT DOCUMENTS

JP    2004-114647    4/2004

* cited by examiner

*Primary Examiner*—Matthew Luu
*Assistant Examiner*—Rut Patel
(74) *Attorney, Agent, or Firm*—Banner & Witcoff, Ltd.

(57) ABSTRACT

Disclosed is a combination of a water-based ink and a wetting solution for ink-jet recording, which enables smooth introduction of the water-based ink into an ink-jet head. One end of a capillary having an inner diameter of from about 0.1 to about 1 mm is dipped in the water-based ink so that the water-based ink rises inside the capillary. A combination of a water-based ink and a wetting solution that satisfy the following formula (1) is selected:

$$Vi/Vs \geq \text{about } 2 \quad (1)$$

wherein Vs indicates a rising speed of the water-based ink at an intermediate position before and after the water-based ink rising when an inner wall of the capillary is in a dry state, and Vi indicates a rising speed of the water-based ink when an inner wall of the capillary is wetted with the wetting solution.

15 Claims, No Drawings

METHOD FOR SELECTING WATER-BASED INK AND WETTING SOLUTION FOR INK-JET RECORDING

CROSS REFERENCE TO RELATED APPLICATION

This application claims priority to Japanese Patent Application No. 2005-266739 filed on Sep. 14, 2005, the entire disclosure of which is hereby incorporated by reference.

BACKGROUND

An ink-jet recording device ejects ink onto a recording material such as recording paper. A thermal ink-jet system generates bubbles through rapid heating and, as a result of increased pressure, ejects fine ink droplets through fine nozzles. Alternatively, a piezoelectric ink-jet system uses a piezoelectric element to eject fine ink droplets.

Water-based inks are useful in such ink-jet recording devices. Such inks are prepared by dissolving or dispersing various colorants in a liquid medium comprising water and a water-soluble organic solvent. For color printing, the basic colors of water-based ink used are yellow, magenta, cyan and black. In addition to these four colors, light magenta, light cyan, red and green are also often used. In addition to dye inks, pigment inks and particle inks are also used.

The ability to introduce the ink into the ink-jet head is a very important matter for the ink ejection performance and the print quality of the ink-jet recording device. The ability to introduce the ink is influenced by the viscosity, the surface tension, the foaming property and the like of the water-based ink. Even if physical properties such as the viscosity and the surface tension of water-based inks are the same, the ability to introduce the inks into an ink-jet head may differ depending on the composition of the water-based ink and on the type of the colorants in the water-based ink. That is, a water-based ink could have a stable dissolution or dispersion state and therefore could produce good print quality; however, the ability to introduce the ink into an ink-jet head may be poor resulting in problems such as printing failures.

Solutions to such problems have been sought. One method introduces water-based ink into the ink-jet head by introducing a wetting solution into the ink-jet head before shipping. Another method removes the water-based ink and replaces the ink with a wetting solution. This latter method is used when the ink-jet recording devices will not be used for a long time. The water-based ink is reintroduced into the ink-jet head before use (See, for example, U.S. Publication No. 2004/0056918 A1).

However, the relationship between the water-based ink and wetting solution has been unclear in regard to improving the ability to introduce the ink into the ink-jet head. That is, there is no guideline to select the combination of water-based ink and wetting solution.

SUMMARY

A method of selecting a combination of a water-based ink and a wetting solution for an ink-jet recording device wherein the combination provides the ability to effectively introduce a water-based ink into an ink-jet head.

DETAILED DESCRIPTION

General Overview

It was found that the ability to introduce ink into an ink-jet head is improved by introducing a wetting solution into the ink-jet head prior to introducing the ink. Based on the knowledge that the ink passage inside the ink-jet head is a capillary having an inner diameter of about 0.1 mm and the introduction of the water-based ink into the ink passage is governed by capillarity phenomenon, it was further found that an effective combination of the water-based ink and the wetting solution can be selected based on the rising speed of the water-based ink through the capillary. More specifically, an index ratio is calculated based on the rising speed of the water-based ink through the capillary previously wetted with a wetting solution to the rising speed of the water-based ink alone through the capillary not wetted with the wetting solution.

Aspects of the invention include a method for selecting a water-based ink and a wetting solution for ink-jet recording, wherein one end of a capillary having an inner diameter of from about 0.1 to about 1 mm is dipped in a water-based ink so that the water-based ink rises inside the capillary, and a combination of the water-based ink and a wetting solution that satisfy the following formula (1) is selected:

$$Vi/Vs \geq \text{about } 2 \tag{1}$$

wherein Vs indicates the rising speed of the water-based ink at an intermediate position before and after the water-based ink has risen when an inner wall of the capillary is dry, and Vi indicates the rising speed of the water-based ink at an intermediate position before and after the water-based ink has risen when an inner wall of the capillary is wetted with the wetting solution.

Further aspects of the invention include a combination of the water-based ink and the wetting solution selected according to the above-mentioned method.

Illustrative Aspects of the Invention

Illustrative aspects of the present invention will be described. These aspects merely provide examples of the invention, and it is needless to say that the aspects can be suitably modified without departing from the gist of the invention.

In accordance with one aspect of the invention, a method for selecting a water-based ink and a wetting solution provides an effective combination of a water-based ink and a wetting solution for various ink-jet recording devices using a water-based ink. The ink-jet ejecting method may be any suitable method, for example but not limited to, a thermal ink-jet method or a piezoelectric ink-jet method.

The method for selecting a water-based ink and a wetting solution is based on the property that when one end of a capillary having an inner diameter of from about 0.1 to about 1 mm is dipped in the water-based ink, the water-based ink rises inside the capillary. Using this property, a combination of the water-based ink and a wetting solution is selected that satisfy the following formula (1):

$$Vi/Vs \geq \text{about } 2 \tag{1}$$

wherein Vs indicates the rising speed of the water-based ink at an intermediate position before and after the water-based ink rising when an inner wall of the capillary is dry, and Vi indicates the rising speed of the water-based ink when an inner wall of the capillary is wetted with the wetting solution.

Relative to the rising speed of the water-based ink inside the capillary owing to capillarity phenomenon, formula (1) indicates that the rising speed of the water-based ink in the capillary previously wetted with the wetting solution is at least about 2 times the rising speed of the water-based ink in the capillary not previously wetted with the wetting solution. When the water-based ink and the wetting solution are selected so as to satisfy the formula (1), then, the ability to introduce ink into the ink-jet head of an ink-jet recording device can be improved by introducing the wetting solution into the ink-jet head prior to introducing the water-based ink.

Formula (1) means that, when the value of Vi/Vs is larger than about 2, the ability to introduce the ink into the ink-jet head is improved by the wetting solution. However, if the value of Vi/Vs is too high, the properties of the water-based ink and the wetting solution may differ too much, and using the water-based ink and the wetting solution in the same ink-jet head may be unfavorable. Accordingly, the value of Vi/Vs is generally from about 2 to about 4.

For obtaining Vi/Vs in formula (1), a capillary is selected having an inner diameter of from about 0.1 to about 1 mm, or from about 0.2 to about 0.4 mm. If the inner diameter is larger than about 1 mm, a water-based ink may not sufficiently rise in the capillary through capillarity phenomenon. Generally, a capillary having an inner diameter of less than about 0.1 mm is difficult to manufacture. A capillary having an inner diameter of from about 0.2 to about 0.4 mm generally corresponds to the inner diameter of ink passages in an ink-jet head. For ease of handling, the length of the capillary is generally from about 50 to about 150 mm.

Generally, to accurately determine the ability to introduce the ink into an ink-jet head, the material of the capillary should be constructed from the same material as the ink passage in an ink-jet head (for example, ceramics, stainless alloys and the like). However, it was found that since it is the ratio of the rising speed of the water-based ink in the capillary previously wetted with the wetting solution to that in the capillary not wetted with the wetting solution (Vi/Vs) that was being considered, the influence of the material of the ink passage on the ratio Vi/Vs is mostly cancelled. Moreover, in order to accurately determine the rising speed of the water-based ink in the capillary, it is desirable that the capillary is formed of a transparent material allowing observation of the inside of the capillary. Accordingly, the material of the capillary can be glass, transparent plastics, and the like.

To obtain the value of formula (1), the rising speed of the water-based ink is measured as follows: First, a suitable glass chamber is filled with a water-based ink to a predetermined height (for example, from about 3 to about 5 mm) at room temperature, and a capillary is dipped into the water-based ink through its liquid face, generally vertically thereto. As a result, the water-based ink begins to rise inside the capillary, and at a certain equivalent point, the water-based ink stops rising. The capillary then contains a certain volume of water-based ink. The rising speed Vs of the water-based ink is measured at a position intermediate between the positions before rising (start position) and after rising (equivalent point). The position may be any specific position but is generally about ½ the distance between the start position and the equivalent point and corresponds to about ½ of the volume of the water-based ink that rises to the equivalent point. In general, depending on the viscosity and the surface tension of the water-based ink, Vs may be measured at the position where the volume of water-based ink that has risen is from about 1 to about 4 µL. This intermediate position is the predetermined position for calculating Vs. The volume (µL) measured at the predetermined position is volume A. The time T is measured from the point the water-based ink begins to rise until the point of the predetermined position. Vs is obtained according to the following formula (2):

$$Vs = A/T \quad (2)$$

The rising speed of the water-based ink in the capillary wetted with a wetting solution Vi may be obtained in the same manner as that for obtaining the rising speed Vs of the water-based ink as above, for which, however, the capillary is previously wetted with the wetting solution.

The capillary may be wetted with a wetting solution, for example, as follows: First, one end of the capillary is dipped in the wetting solution. Subsequently, highly water-absorptive paper, nonwoven fabric or woven fabric is applied to the end of the capillary with the wetting solution, so that the wetting solution in the capillary is absorbed by the highly water-absorptive paper, nonwoven fabric or woven fabric. Therefore no wetting solution remains inside the capillary except, as a result of the process, the inner wall of the capillary is wetted with the wetting solution.

Suitable combinations of a water-based ink and a wetting solution may be selected by determining which combinations satisfy formula (1) by trial and error. For example, a specific water-based ink is first selected, then a wetting solution for the water-based ink that satisfies the formula (1) may be determined by trial and error. Alternatively, a specific wetting solution is first selected, then a water-based ink for the wetting solution that satisfies the formula (1) may be sought by trial and error.

Any known water-based ink compositions and wetting solutions may be used in the method. For example, the water-based ink may comprise a colorant, water, and a water-soluble organic solvent.

Suitable colorants include, but are not limited to, a direct dye, an acid dye, a basic dye, a reactive dye and the like. Criteria for suitable colorants for water-based ink for ink-jet recording generally include sharpness, vividness, water-solubility, stability, lightfastness and the like. Suitable colorants meeting such criteria include, but are not limited to, C.I. Direct Black 17, 19, 32, 51, 71, 108, 146, 154 and 168; C.I. Direct Blue 6, 22, 25, 71, 86, 90, 106 and 199; C.I. Direct Red 1, 4, 17, 28, 83 and 227; C.I. Direct Yellow 12, 24, 26, 86, 98, 132 and 142; C.I. Direct Orange 34, 39, 44, 46 and 60; C.I. Direct Violet 47 and 48; C.I. Direct Brown 109; C.I. Direct Green 59; C.I. Acid Black 2, 7, 24, 26, 31, 52, 63, 112 and 118; C.I. Acid Blue 9, 22, 40, 59, 93, 102, 104, 117, 120, 167, 229 and 234; C.I. Acid Red 1, 6, 32, 37, 51, 52, 80, 85, 87, 92, 94, 115, 180, 256, 289, 315 and 317; C.I. Acid Yellow 11, 17, 23, 25, 29, 42, 61 and 71; C.I. Acid Orange 7 and 19; C.I. Acid Violet 49; C.I. Basic Black 2; C.I. Basic Blue 1, 3, 5, 7, 9, 24, 25, 26, 28 and 29; C.I. Basic Red 1, 2, 9, 12, 13, 14 and 37; C.I. Basic Violet 7, 14 and 27; C.I. Food Black 1 and 2; and the like. The amount of the colorant to be in the water-based ink may be generally from about 0.1 to about 20% by weight of the overall weight of the water-based ink.

Various inorganic pigments or organic pigments may also be used as the colorant. In addition, self-dispersing type pigments prepared by hydrophilicating the surfaces of pigments are also usable herein.

Water used in the water-based ink may be ion-exchanged water, distilled water or ultra-pure water which have high purity for the purpose of preventing the clogging of ink-jet heads by impurities. The amount of water used in the water-based ink may be determined within a broad range depending on the water-based ink composition and the necessary properties of the water-based ink, but in general, may be from about 10 to about 90% by weight, or from about 15 to about 80% by weight, of the overall weight of the water-based ink.

Water-soluble organic solvents that may be used in the water-based ink are generally classified into solvents that prevent the water-based ink from being dried at the nozzle tip of an ink-jet head and solvents that promote the drying speed of the water-based ink on a recording material such as paper. The amounts of such water-soluble organic solvents is within the skill of the art.

Water-soluble organic solvents suitable for preventing the drying of water-based ink include, but are not limited to, lower alcohols such as methyl alcohol, ethyl alcohol, n-propyl alcohol, isopropyl alcohol, n-butyl alcohol, sec-butyl alcohol, tert-butyl alcohol; amides such as dimethylformamide, dimethylacetamide; ketones or ketoalcohols such as acetone, diacetonalcohol; ethers such as tetrahydrofuran, dioxane; polypropylene glycol; alkylene glycols such as ethylene glycol, propylene glycol, butylene glycol, diethylene glycol, triethylene glycol, dipropylene glycol, tripropylene glycol, thiodiglycol, hexylene glycol; glycerin; 2-pyrrolidone, N-methyl-2-pyrrolidone; 1,3-dimethyl-2-imidazolidinone; and the like. Of those, especially preferred are glycerin and alkylene glycols such as diethylene glycol.

Water-soluble organic solvents suitable for promoting the drying speed of water-based ink include, but are not limited to, glycol ethers such as ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, tripropylene glycol propyl ether, tripropylene glycol butyl ether.

The water-soluble organic solvents may be used either singly or in combination depending on the properties of the water-based ink.

Various additives may be added to the water-based ink, if desired. Examples of such additives include, but not limited to, viscosity modifier such as polyvinyl alcohol, celluloses, water-soluble resin, as well as surfactants and mildewproofing agents.

The composition of the wetting solution may correspond to the water-based ink composition, but typically the wetting solution does not contain a colorant. In addition, the wetting solution may contain a polymer and/or surfactant which are usually not present in the water-based ink.

The wetting solution may be any wetting solution that satisfies Vi/Vs≧2. The wetting solution may also function as a preservative solution and/or as a storage solution.

After satisfying the formula (1), the wetting solution generally has a dynamic contact angle (drop method) to the ink passage material of an ink-jet head of at most 20° in 100 msec after the wetting solution dropping. The wetting solution may have sufficient wettability for the ink passage material of an ink-jet head, and therefore may completely cover the inner wall of the ink passage.

The ink passage of an ink-jet head may be formed from any suitable material such as, but are not limited to, ceramics, stainless alloys or the like generally used for such ink passages.

EXAMPLES (1) Preparation of Water-Based Ink:

2 parts by weight of C.I. Acid Red 82 (water-soluble red dye), 20 parts by weight of glycerin, 5 parts by weight of 2-pyrrolidone, 4 parts by weight of diethylene glycol butyl ether and a balance of water were stirred and mixed for 10 minutes, and then filtered through a membrane filter having a pore size of 0.1 µm to obtain a water-based ink.

(2) Preparation of Wetting Solutions:

0.2 parts by weight of Emulgen® (products of Kao Corporation; nonionic surfactant), 15 parts by weight of glycerin, 10 parts by weight of polyethylene glycol #200 (average molecular weight is 190 to 200), 2 parts by weight of diethylene glycol butyl ether and a balance of water were stirred and mixed for 10 minutes, and then filtered through a membrane filter having a pore size of 0.1 µm to obtain a wetting solution 1.

Wetting solutions 2 to 7 were obtained in the same manner as the wetting solution 1, but with the nonionic surfactant listed in Table 1.

(3) Evaluation:

(3-1) Water-Based Ink Rising Speed in Glass Capillary:

The water-based ink prepared in (1) was put into a narrow-necked glass bottle (Bottle Standard No. 2, 24 mL) to a height from the bottom thereof of 4 mm. One end of a glass capillary, having markings every 1 µL and an inner diameter of 0.3 mm, was dipped into the water-based ink, nearly vertically to the liquid surface of the water-based ink, and at the same time, the time taken by the water-based ink rising in the capillary was counted with a stopwatch. The time in which the water-based ink rose by 2 µL is indicated by Ts (sec); the length of the capillary corresponding to 2 µL is indicated by L (mm); and the rising speed of the water-based ink Vs was calculated.

Next, one end of the glass capillary in having markings every 1 µL was dipped in a narrow-mouth glass bottle filled with the wetting solution prepared in (2). Then, after equilibrated, the glass capillary was taken out of the wetting solution, and Kimwipe® (products of Crecia Corporation) was applied to the end of the glass capillary that had been dipped in the wetting solution. The wetting solution remained inside the glass capillary was absorbed and removed, and in addition, the wetting solution on the outer surface of the capillary was also wiped away. Next, the one end of the glass capillary was dipped in the glass bottle filled with the water-based ink, nearly vertically to the liquid surface of the water-based ink. In the same manner as above, the rising speed of the water-based ink Vi was calculated from the rising time, Ti (sec), of the water-based ink and the length of the capillary corresponding to 2 µL, L (mm). Then, the ratio of the rising speed of the water-based ink Vi/Vs was calculated. The results are given in Table 2.

(3-2) Measurement of Initial Dynamic Contact Angle after 100 msec:

An $SiO_2$-deposited surface used in the shear-mode ink-jet head disclosed in U.S. Pat. No. 6,070,310 was used as the material forming the ink passage of an ink-jet head. 1.5 µL of each wetting solution was dropped onto the horizontal surface, and the dynamic contact angle of the drop was measured in 100 msec after the dropping, using a contact angle meter (Drop Master 700; products of Kyowa Interface Science Co, ltd.). The results are given in Table 2.

(3-3) Evaluation of the Ability to Introduce Ink into Actual Ink-Jet Head:

A cartridge filled with the water-based ink (hereinafter referred to as a water-based ink cartridge) was fitted to the ink-jet printer disclosed in U.S. Pat. No. 6,247,782 B1 with the shear-mode inkjet head disclosed in U.S. Pat. No. 6,070,310 mounted thereon, and the water-based ink was introduced into the ink-jet head and ejected out of it, whereupon the ejecting failure at the initial ejecting stage was checked.

Next, the water-based ink cartridge was taken off, and a cartridge filled with a wetting solution (hereinafter referred to as a wetting solution cartridge) was fitted to the ink-jet printer, and the wetting solution was introduced into the ink-jet head and ejected out of it continuously for 1 minute. Thereafter the wetting solution cartridge was taken off, and ejecting was continued for 1 minute with no cartridge fitted to the ink-jet printer to remove the superfluous wetting solution in the ink-jet head. Next, a water-based ink cartridge was fitted to the ink-jet printer, and the water-based ink was introduced into the ink-jet head and ejected out of it, whereupon the ejecting failure at the initial ejecting stage was checked.

In checking for the ejecting failure, "A" indicates no ejecting failure; "B" indicates an ejecting failure of less than 0.5%; "C" indicates an ejecting failure of from 0.5 to 5%; and "D" indicates an ejecting failure of more than 5%. "A" and "B" represent a good ability to introduce the ink. The results are given in Table 2.

From the results in Table 2, the combinations of the water-based ink and the wetting solution (wetting solutions 3, 5, 6 and 7) produced a good ability to introduce the ink into the ink-jet head. These combinations satisfied Vi/Vs of at least 2 wherein Vs indicates the rising speed of the water-based ink when the inner wall of the glass capillary (inner diameter of 0.3 mm) is dry, and Vi indicates the rising speed of the water-based ink when the inner wall of the glass capillary is wetted with the wetting solution. The wetting solutions 3 and 7 produced the best results. After dropping the wetting solution onto the material of the ink passage, both solutions 3 and 7 had an initial dynamic contact angle of less than 20° in 100 msec wetting indicating good wettability.

In contrast, the wetting solutions 1, 2 and 4 did not satisfy the Vi/Vs ratio and/or the contact angle and failed to smoothly introduce the ink into the ink-jet head.

What is claimed is:

1. A method for selecting a combination of water-based ink and wetting solution for ink-jet recording, comprising:

dipping one end of a capillary having an inner diameter of from about 0.1 to about 1 mm in a water-based ink, wherein an inner wall of the capillary is dry and the water-based ink rises inside the capillary, and measuring Vs, dipping one end of the capillary in the water-based ink, wherein an inner wall of the capillary is wetted with a wetting solution and the water-based ink rises inside the capillary, and measuring Vi, and selecting a combination of the water-based ink and the wetting solution if the combination satisfies the following formula (1):

$$Vi/Vs \geq 2 \qquad (1)$$

Wherein:

i) Vs indicates a rising speed of water-based ink at an intermediate position before and after rising when the inner wall of the first capillary is dry, and ii) Vi indicates a rising speed, of water-based ink at an intermediate position before and after rising when the inner wall of the second capillary is wetted with the wetting solution;

TABLE 1

(Unit: wt. %)

| | Water-based Ink | Wetting Solution 1 | Wetting Solution 2 | Wetting Solution 3 | Wetting Solution 4 | Wetting Solution 5 | Wetting Solution 6 | Wetting Solution 7 |
|---|---|---|---|---|---|---|---|---|
| C.I. Acid Red 82 | 2 | — | — | — | — | — | — | — |
| Glycerin | 20 | 15 | 15 | 15 | 15 | 15 | 15 | 15 |
| Polyethylene glycol #200 | — | 10 | 10 | 10 | 10 | 10 | 10 | 10 |
| 2-Pyrrolidone | 5 | — | — | — | — | — | — | — |
| Diethylene Glycol Butyl Ether | 4 | 2 | 2 | 2 | 2 | 2 | 2 | 2 |
| Emulgen ® 108 (*1) | — | 0.2 | — | — | — | — | — | — |
| Amorox DMC-W *2 | — | — | 0.2 | — | — | — | — | — |
| Newpole ® PE-64 (*3) | — | — | — | 0.2 | — | — | — | 0.02 |
| Esomin C/15 (*4) | — | — | — | — | 0.2 | — | — | — |
| Olfin ® E1010 (*5) | — | — | — | — | — | 0.2 | — | — |
| Surfinol ® 485 (*6) | — | — | — | — | — | — | 0.2 | — |
| Water | balance | balance | balance | balance | balance | balance | balance | balance |

*1: nonionic surfactant; polyoxyethylene lauryl ether; product of Kao Corporation
*2: nonionic surfactant; N,N-dimethylallyl(C8-18) amine oxide; product of Lion Akzo Co., Ltd.
*3: nonionic surfactant; product of Sanyo Chemical Industries, Ltd.
*4: nonionic surfactant; polyoxyethylene alkyl(C8-18) amine; product of Lion Akzo Co., Ltd.
*5: nonionic surfactant; adduct of acetylene glycol with ethylene oxide (10 mol); product of Nissin Chemical Industry Co., Ltd.
*6: nonionic surfactant; product of Nissin Chemical Industry Co., Ltd.

TABLE 2

| | L/Ts (=Vs) | L/Ti (=Vi) | Vi/Vs | Dynamic Contact Angle (°) | Ability to Introduce the Ink |
|---|---|---|---|---|---|
| Water-Based Ink | L/4.48 | — | 1.0 | 19.1 | D |
| Wetting Solution 1 | — | L/3.36 | 1.3 | 11.5 | C |
| Wetting Solution 2 | — | L/3.65 | 1.2 | 42.6 | D |
| Wetting Solution 3 | — | L/2.09 | 2.1 | 15.6 | A |
| Wetting Solution 4 | — | L/2.91 | 1.5 | 29.1 | C |
| Wetting Solution 5 | — | L/2.21 | 2.0 | 22.9 | B |
| Wetting Solution 6 | — | L/1.64 | 2.7 | 29.2 | B |
| Wetting Solution 7 | — | L/1.74 | 2.6 | 19.3 | A | wherein the intermediate position corresponds to a volume (A) of water-based ink of about 1 to about 4 μl.

2. The method according to claim 1, wherein the inner diameter of the capillary is from about 0.2 to about 0.4 mm.

3. The method according to claim 1, wherein the wetting solution has a dynamic contact angle of at most 20° in 100 msec when the wetting solution is dropped on a material corresponding to material forming an ink passage of an ink-jet head.

4. The method of claim 1, wherein Vi/Vs is 2 to 4.

5. The method of claim 1, wherein the rising speed of the water-based ink is calculated by dividing the volume (A) by the time (T) taken to reach volume (A).

6. The method of claim 1, further comprising dipping the capillary in a substantially vertical position.

7. A method for selecting a water-based ink and a wetting solution for ink-jet recording, comprising:
dipping one end of a first capillary having an inner diameter of from about 0.1 to about 1 mm in a water-based ink, wherein an inner wall of the first capillary is dry and the water-based ink rises inside the capillary, and measuring Vs,
dipping one end of the capillary in the water-based ink, wherein an inner wall of the capillary is wetted with a wetting solution and the water-based ink rises inside the capillary, and measuring Vi, and
selecting a combination of the water-based ink and the wetting solution if the combination satisfies the following formula (1):

$$Vi/Vs \geq 2 \qquad (1)$$

wherein
i) Vs indicates a rising, speed of water-based ink at an intermediate position before and after rising when the inner wall of the capillary is dry, and
ii) Vi indicates a rising speed of water-based ink at an intermediate position before and after rising when the inner wall of the capillary is wetted with the wetting solution;
wherein the intermediate position corresponds to a volume (A) of water-based ink of about 1 to about 4 μl; and
wherein the wetting solution has a dynamic contact angle of at most 20° in 100 msec when the wetting solution is dropped on a material corresponding to material forming an ink passage of an ink-jet head.

8. A method for selecting a wetting solution based on a pre-selected water-based ink, comprising:
dipping one end of a capillary having an inner diameter of from about 0.1 to about 1 mm in the water-based ink, wherein an inner wall of the capillary is dry and the water-based ink rises inside the first capillary, and measuring Vs,
dipping one end of the capillary in the water-based ink, wherein an inner wall of the capillary is wetted with a wetting solution and the water-based ink rises inside the capillary, and measuring Vi, and
selecting the wetting solution if the wetting solution satisfies the following formula (1):

$$Vi/Vs \geq 2 \qquad (1)$$

Wherein:
i) Vs indicates a rising speed of water-based ink at an intermediate position before and after rising when the inner wall of the capillary is dry, and
ii) Vi indicates a rising speed of water-based ink at an intermediate position before and after rising when the inner wall of the second capillary is wetted with the wetting solution;
wherein the intermediate position corresponds to a volume (A) of water-based ink of about 1 to about 4 μl.

9. A method of preparing inkjet passages for storage comprising:
first: selecting a wetting solution based on a pre-selected water-based ink, and
second: introducing the wetting solution into the ink-jet passages;
wherein the wetting solution is selected by the process comprising:
dipping one end of a capillary having an inner diameter of from about 0.1 to about 1 mm in the water-based ink, wherein an inner wall of the capillary is dry and the water-based ink rises inside the capillary, and measuring Vs,
dipping one end of the capillary in the water-based ink, wherein an inner wall of the capillary is wetted with a wetting solution and the water-based ink rises inside the capillary, and measuring Vi, and
selecting the wetting solution if the wetting solution satisfies the following formula (1):

$$Vi/Vs \geq 2 \qquad (1)$$

Wherein:
i) Vs indicates a rising speed of water-based ink at an intermediate position before and after rising when the inner wall of the first capillary is dry, and
ii) Vi indicates a rising speed of water-based ink at an intermediate position before and after rising when the inner wall of the capillary is wetted with the wetting solution;
wherein the intermediate position corresponds to a volume (A) of water-based ink of about 1 to about 4 μl.

10. A combination of water-based ink and a wetting solution selected according to the method of claim 1.

11. A combination of water-based ink and a wetting solution that satisfies the following formula (1):

$$Vi/Vs \geq 2 \qquad (1)$$

wherein:
i) Vs indicates a rising speed of water-based ink at an intermediate position before and after rising when the inner wall of a capillary is dry, and
ii) Vi indicates a rising speed of water-based ink at an intermediate position before and after rising when the inner wall of the capillary is wetted with the wetting solution;
wherein the intermediate position corresponds to a volume (A) of water-based ink of about 1 to about 4 μl.

12. The combination of claim 11, wherein Vi/Vs is 2 to 4.

13. The combination of claim 11, wherein the rising speed of the water-based ink is calculated by dividing the volume (A) by the time (T) taken to reach volume (A).

14. The combination of claim 11, wherein the inner diameter of the capillary is from about 0.2 to about 0.4 mm.

15. The combination of claim 11, wherein the wetting solution has a dynamic contact angle of at most 20° in 100 msec when the wetting solution is dropped on a material corresponding to material forming an ink passage of an ink jet head.

* * * * *

UNITED STATES PATENT AND TRADEMARK OFFICE
CERTIFICATE OF CORRECTION

| | |
|---|---|
| PATENT NO. | : 7,824,028 B2 |
| APPLICATION NO. | : 11/516648 |
| DATED | : November 2, 2010 |
| INVENTOR(S) | : Hideto Yamazaki |

It is certified that error appears in the above-identified patent and that said Letters Patent is hereby corrected as shown below:

In Column 9, Claim 7, Lines 18 and 20:
  Please replace "first capillary" with --capillary--

Signed and Sealed this
Fourteenth Day of June, 2011

David J. Kappos
*Director of the United States Patent and Trademark Office*